(12) United States Patent
Kawabata et al.

(10) Patent No.: US 10,677,531 B2
(45) Date of Patent: Jun. 9, 2020

(54) HEAT EXCHANGER, AIR-CONDITIONING APPARATUS INCLUDING THE SAME, AND METHOD OF PRODUCING FLAT-TUBE U-BEND

(71) Applicant: Mitsubishi Electric Corporation, Tokyo (JP)

(72) Inventors: Ryohei Kawabata, Tokyo (JP); Tsukasa Tanigawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 30 days.

(21) Appl. No.: 15/770,591

(22) PCT Filed: Dec. 25, 2015

(86) PCT No.: PCT/JP2015/086205
§ 371 (c)(1),
(2) Date: Apr. 24, 2018

(87) PCT Pub. No.: WO2017/109933
PCT Pub. Date: Jun. 29, 2017

(65) Prior Publication Data
US 2018/0320977 A1    Nov. 8, 2018

(51) Int. Cl.
*F28D 1/047*    (2006.01)
*B23K 1/00*    (2006.01)
(Continued)

(52) U.S. Cl.
CPC ........... *F28D 1/0478* (2013.01); *B21D 53/06* (2013.01); *B23K 1/0012* (2013.01); *B23K 1/20* (2013.01);
(Continued)

(58) Field of Classification Search
CPC .......... F28D 1/0473; F28D 7/06; F28D 1/053; F28D 1/0477; F28F 1/325; F28F 9/26; F28F 1/32; F25B 39/00
See application file for complete search history.

(56) References Cited

U.S. PATENT DOCUMENTS

2013/0299132 A1\* 11/2013 Guilford .................. F28F 1/00
                                                    165/67
2016/0223265 A1\* 8/2016 Jindou ..................... F24F 1/18

FOREIGN PATENT DOCUMENTS

JP       S61-106781 U    7/1986
JP       2007-192474 A   8/2007
(Continued)

OTHER PUBLICATIONS

JP 2007192474 translation.\*
(Continued)

*Primary Examiner* — Elizabeth J Martin
(74) *Attorney, Agent, or Firm* — Posz Law Group, PLC

(57) ABSTRACT

A heat exchanger includes plural flat tubes each having a flat cross section, and plural flat-tube U-bends each having a flat cross section and a U-shape in external appearance. Plural flat-tube columns each made up of the plural flat tubes installed in plural tiers in a set direction are arranged in a direction intersecting the set direction and in a staggered manner. Each of the plural flat-tube U-bends is placed in a pair of coupling portions of the plural flat tubes. Each of the pair of coupling portions is placed in one of a pair of the plural flat-tube columns. The plural flat-tube U-bends are twisted such that major axes of flat cross sections in both end portions of each of the plural flat-tube U-bends are oriented in the same directions as major axes of flat cross sections of the plural flat tubes connected to the both end portions.

15 Claims, 7 Drawing Sheets

(51) Int. Cl.

| | |
|---|---|
| *F28F 9/26* | (2006.01) |
| *F28F 1/02* | (2006.01) |
| *B23K 1/20* | (2006.01) |
| *F28F 1/32* | (2006.01) |
| *B21D 53/06* | (2006.01) |
| *B23K 101/14* | (2006.01) |
| *F28F 9/013* | (2006.01) |
| *B23K 101/06* | (2006.01) |
| *F28D 21/00* | (2006.01) |

(52) U.S. Cl.
CPC ............... *F28D 1/047* (2013.01); *F28F 1/02* (2013.01); *F28F 1/32* (2013.01); *F28F 1/325* (2013.01); *F28F 9/26* (2013.01); *F28F 9/268* (2013.01); *B23K 2101/06* (2018.08); *B23K 2101/14* (2018.08); *F28D 2021/0068* (2013.01); *F28F 9/013* (2013.01); *F28F 2275/04* (2013.01)

(56) References Cited

FOREIGN PATENT DOCUMENTS

| | | |
|---|---|---|
| JP | 2012-032089 A | 2/2012 |
| JP | 2012-082986 A | 4/2012 |
| JP | 2015-055410 A | 3/2015 |
| JP | 2015-055413 A | 3/2015 |

OTHER PUBLICATIONS

International Search Report of the International Searching Authority dated Mar. 15, 2016 for the corresponding international application No. PCT/JP2015/086205 (and English translation).

Office Action dated Mar. 20, 2018 issued in corresponding JP patent application No. 2017-557617 (and English translation).

* cited by examiner

HEAT EXCHANGER, AIR-CONDITIONING APPARATUS INCLUDING THE SAME, AND METHOD OF PRODUCING FLAT-TUBE U-BEND

CROSS REFERENCE TO RELATED APPLICATION

This application is a U.S. national stage application of PCT/JP2015/086205 filed on Dec. 25, 2015, the contents of which are incorporated herein by reference.

TECHNICAL FIELD

The present invention relates to a heat exchanger in which flat-tube U-bends are connected to a pair of coupling parts that are each located in a corresponding one of columns of pipes that are next to each other and through which a fluid flows, to an air-conditioning apparatus including the heat exchanger, and to a method of producing the flat-tube U-bend.

BACKGROUND ART

A heat exchanger used in a refrigeration apparatus, an air-conditioning apparatus, or a heat pump is generally made up of plural fins arranged at intervals and penetrated by heat transfer tubes. Plural tiers of the heat transfer tubes are arranged in a direction intersecting airflow and plural columns of the heat transfer tubes, made up of the plural tiers, are arranged along a direction of the airflow. In a typical configuration, refrigerant flows through the heat transfer tubes, and the heat exchanger makes up a part of a refrigerant circuit.

Some of heat exchangers such as described above use flat tubes with a flat cross section for the heat transfer tubes and have U-bends connected to a pair of coupling portions that are each located in a corresponding one of plural columns of flat tubes that are next to each other or to a pair of coupling portions that are each located in a corresponding one of plural tiers of flat tubes that are next to each other. For example, there is a technique whereby using joints each having a flat cross section at one end, and a circular cross section at the other end, flat tubes are connected with each other via the joints adapted to convert a cross-sectional shape and separate U-bends (hereinafter referred to as "circular-tube U-bends") made up of circular tubes and adapted to connect circular portions of the joints with each other (see, for example. Patent Literature 1).

Also, there is a technique whereby flat tubes are connected with each other without using a joint such as described above, but using a connecting pipe to which circular tube portions and flat-shaped portions are integrated by forming both end portions of a circular-tube U-bend into a flat shape (see, for example, Patent Literature 2).

Also, there is a technique whereby flat tubes placed at the same height and in different columns are connected with each other using a connecting flat tube that is uniformly flat in cross section (see, for example, Patent Literature 3).

Furthermore, in a heat exchange unit of a double-column structure using flat tubes, a pair of coupling portions that are each located in a corresponding one of flat-tube columns horizontally arranged next to each other are coupled together by U-shaped connecting pipes, the connecting pipes are each created by flattening both ends of a circular tube bent into a U-shape, both end portions of the connecting pipe are made of a clad material with a brazing material bonded to an inner circumferential surface, and the connecting pipes and flat tubes are joined together by brazing (see, for example, Patent Literature 4).

CITATION LIST

Patent Literature

Patent Literature 1: Japanese Unexamined Patent Application Publication No. 2012-32089 (Paragraph [0011], FIGS. 2 to 4)

Patent Literature 2: Japanese Unexamined Patent Application Publication No. 2012-82986 (Paragraph [0022], FIGS. 1 and 6)

Patent Literature 3: Japanese Unexamined Patent Application Publication No. 2015-55410 (Paragraphs [0142] and [0143], FIGS. 13 and 14)

Patent Literature 4: Japanese Unexamined Patent Application Publication No. 2015-55413 (Paragraphs [0115], [0116], and [0118], FIGS. 11 and 12)

SUMMARY OF INVENTION

Technical Problem

However, the technique of Patent Literature 1, whereby joints are connected to end portions serving as coupling parts between the flat tubes and the flat tubes are connected with the circular-tube U-bends via the joints, increases the number of junction points between the flat tubes and joints, thereby increasing occurrence probability of producing defects. Furthermore, material cost of joint parts is also required, posing a problem of increased cost.

Also, the technique of Patent Literature 2, which can reduce the number of junction points in connecting portions between the flat tubes, can reduce the occurrence probability of producing defects compared to the technique of Patent Literature 1 described above. However, with the technique of Patent Literature 2, because flow paths that are circular in cross section are provided to connecting portions between the flat tubes, changes in flow path shape cause pressure losses, resulting in performance degradation. The pressure losses caused by such changes in flow path shape can be reduced by extending a length of conversion portions running from the flat-shaped portions to the circular tube portion, but this configuration increases a length of connecting portions, posing problems of increased material cost and placement restrictions of other components.

Also, with the technique of Patent Literature 3, when the connecting flat tube is created by being bent in a planar fashion, a difference between an inner radius and an outer radius of a bent portion increases. This configuration decreases a wall thickness of an outer radius portion on which a tensile load is applied during bending, reducing pressure capacity. Also, there is a problem of increased bend radius.

Furthermore, with the technique of Patent Literature 4, because the flat tubes are inserted inside clad layers in the both end portions of the connecting pipe, the clad layer is always smaller in volume than a clearance between base material and each flat tube. When the brazing material is smaller than the clearances in volume, a problem of poor brazing is caused or a problem is caused in that fillets are not formed on an outer side of the connecting pipe, so that a brazing state is hard to be visually confirmed by appearances.

The present invention has been made to solve at least one of the above problems, and a main object of the present invention is to reduce the number of parts used and reduce pressure losses in flow paths in installing a coupling structure that couples plural columns of flat tubes arranged in a staggered manner.

Solution to Problem

A heat exchanger according to one embodiment of the present invention includes plural flat tubes each having a flat cross section, and plural flat-tube U-bends each having a flat cross section and a U-shape in external appearance. Plural flat-tube columns each made up of the plural flat tubes installed in plural tiers in a set direction are arranged in a direction intersecting the set direction. The plural flat tubes in the plural flat-tube columns are arranged in a staggered manner in the set direction. Each of the plural flat-tube U-bends are placed in a pair of coupling portions of the plural flat tubes. Each of the pair of coupling portions is placed in one of a pair of the plural flat-tube columns that are next to each other in the direction intersecting the set direction. The plural flat-tube U-bends are twisted such that major axes of flat cross sections in both end portions of each of the plural flat-tube U-bends are oriented in the same directions as major axes of flat cross sections of the plural flat tubes connected to the both end portions.

Advantageous Effects of Invention

In the heat exchanger according to one embodiment of the present invention, the flat tubes in the plural columns are arranged in a staggered manner, the flat-tube U-bends placed in a pair of coupling portions that are each located in a corresponding one of the flat-tube columns that are next to each other are twisted such that the major axes of flat cross sections in at least the both end portions of each of the flat-tube U-bends are oriented in the same direction as the major axes of the flat cross sections of the flat tubes connected to the both end portions, and consequently a flow path becomes uniformly flat in cross section, eliminating the need for a joint part used to convert the cross-sectional shape. The orientation of the both end portions of the flat-tube U-bends is changed smoothly, thereby reducing pressure losses in the flow path.

DESCRIPTION OF EMBODIMENTS

Embodiment 1

Figure 1:
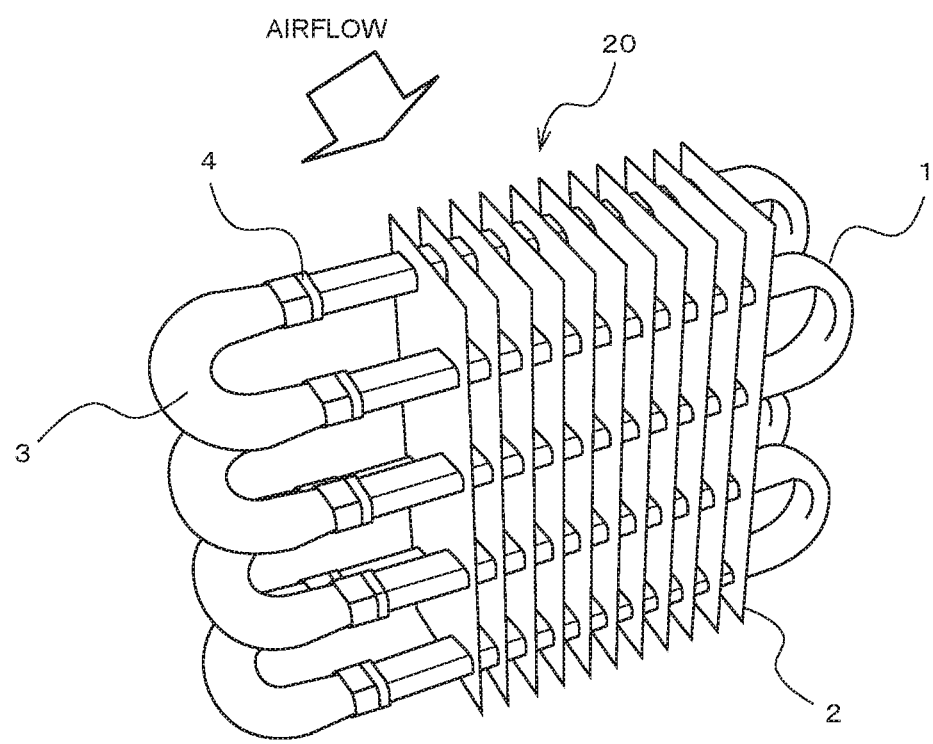
FIG. 1 is a perspective view showing an overall configuration of a heat exchanger according to Embodiment 1 of the present invention.
Figure 2:
FIG. 2 is a sectional view of a flat tube of the heat exchanger according to Embodiment 1 of the present invention.

FIG. 1 is a perspective view showing an overall configuration of a heat exchanger according to Embodiment 1 of the present invention. FIG. 2 is a sectional view of a flat tube of the heat exchanger according to Embodiment 1 of the present invention.

As shown in FIG. 1, the heat exchanger 20 of Embodiment 1 includes flat tubes 1, which serve as heat transfer tubes, and fins 2 placed around the flat tubes 1 to improve heat exchange efficiency. As shown in FIG. 2, the flat tubes 1 each have a flat cross sectional shape in a direction orthogonal to a tube axis and has its inner part divided into plural flow paths 1a. Consequently, the flat tubes 1 obtain a flow-regulating effect, further improving heat exchange efficiency. Plural fins 2 are placed in parallel at intervals and are penetrated by the flat tubes 1.

Plural tiers of the flat tubes 1 are arranged in a set direction intersecting airflow, and end portions on a side (right side in FIG. 1) not connected to joints are bent like hairpins. Then, plural columns of the flat tubes 1, made up of plural tiers, are arranged along a direction of the airflow. Also, the flat tubes in adjacent columns are arranged in a staggered manner in the set direction, that is, in a stacking direction of the tiers. That is, the flat tubes 1 in the plural columns are arranged in a staggered manner such that positions of end portions on a side (left side in FIG. 1) requiring joints are displaced from each other in the direction intersecting the airflow. Then, a pair of coupling portions that are each located in a corresponding one of the columns of the flat tubes 1 that are next to each other are joined together by a flat-tube U-bend 3.

Figure 3:
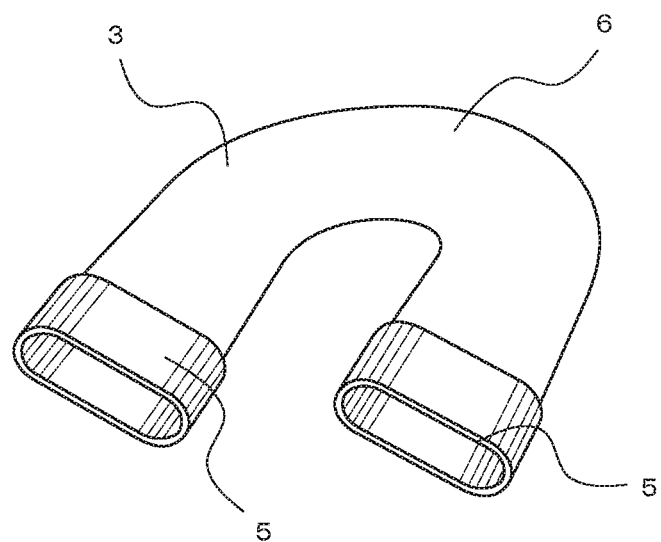
FIG. 3 is a perspective view of a flat-tube U-bend in the heat exchanger according to Embodiment 1 of the present invention.
Figure 4:
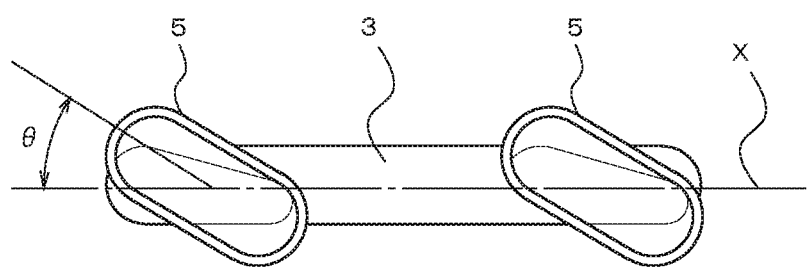
FIG. 4 is a front view of the flat-tube U-bend of FIG. 3.

FIG. 3 is a perspective view showing a flat-tube U-bend in the heat exchanger according to Embodiment 1 of the present invention. FIG. 4 is a front view of the flat-tube U-bend of FIG. 3.

As shown in FIGS. 3 and 4, the flat-tube U-bend includes a main body portion 6 having a U-shape in external appearance and end portions 5 serving as junctions with the flat tubes 1. The flat-tube U-bend 3 has a uniformly flat cross section, but the end portions 5 into which the flat tubes 1 to be inserted and connected are expanded.

More specifically, the flat-tube U-bend 3 is formed into a U-shape in the same plane X along a major axis of the flat cross section and is twisted such that the major axes of the flat cross sections in at least the both end portions 5 of the flat-tube U-bend 3 are oriented in the same direction as major axes of flat cross sections of the flat tubes 1 to be connected. A twist angle $\theta$ depends on placement of the flat tubes 1 to be connected.

Note that the junctions between the flat-tube U-bend 3 and the flat tubes 1 are fixed securely by brazing.

Figure 5:
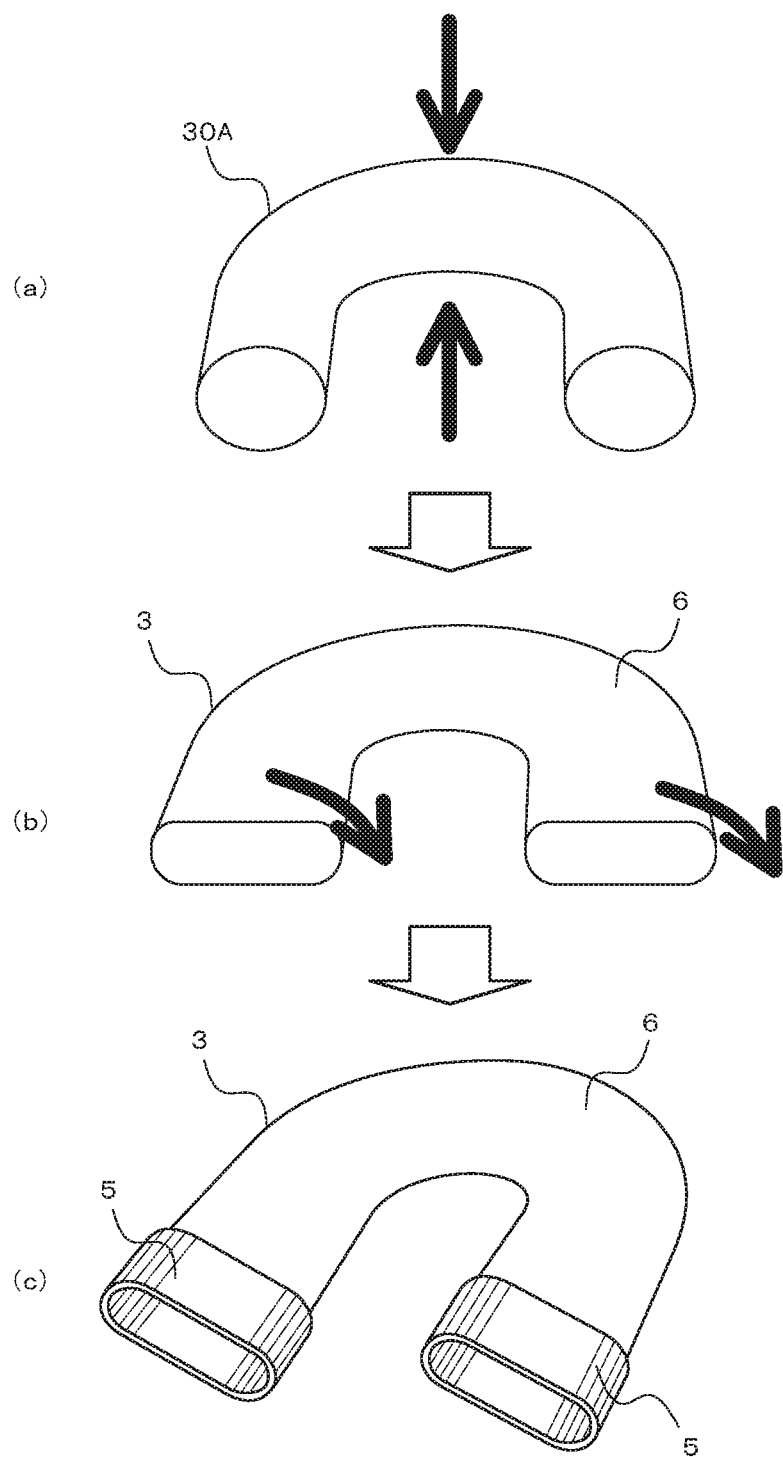
FIG. 5 is a process chart showing a method of producing the flat-tube U-bend of the heat exchanger according to Embodiment 1 of the present invention.

Next, a method of producing the flat-tube U-bend 3 in Embodiment 1 will be described in line with FIG. 5 and with reference to FIGS. 1 to 4. FIG. 5 is a process chart showing the method of producing the flat-tube U-bend of the heat exchanger according to Embodiment 1 of the present invention. The flat-tube U-bend 3 is produced to bridge between the flat tubes 1 that are arranged in a staggered manner and are to be connected to the flat-tube U-bend 3.

First, a circular-tube U-bend 30A is created by being bent into a U-shape in the same plane X (Part (a) of FIG. 5). Next, the flat-tube U-bend 3 is created by compressing the entire circular-tube U-bend 30A in a tube diameter direction such that the circular-tube U-bend 30A becomes flat in cross section (Part (b) of FIG. 5).

Subsequently, the both end portions 5 of the flat-tube U-bend 3 are twisted such that the major axes of the flat cross sections are oriented in the same direction as the major axes of the flat cross sections of the flat tubes 1 to be connected, then the both end portions 5 are expanded, and thus the flat-tube U-bend 3 is produced (Part (c) of FIG. 5).

The flat-tube U-bends 3 produced as described above have their both end portions 5 joined by brazing to the flat tubes 1 arranged in a staggered manner to thereby obtain the heat exchanger such as shown in FIG. 1.

In this manner, in the heat exchanger 20 of Embodiment 1, the flat-tube U-bend 3 is twisted such that the major axes of the flat cross sections in both end portions 5, which are to become junctions, are oriented in the same direction as the major axes of the flat cross sections of the flat tubes 1 that are arranged in a staggered manner and are to be connected to the flat-tube U-bend 3. Consequently, in the heat exchanger 20 of Embodiment 1, the flow paths become uniformly flat in cross section, eliminating the need for joint parts used to convert the cross-sectional shape. Also, the orientation of the both end portions of the flat-tube U-bends can be changed smoothly, thereby reducing pressure losses in the flow paths.

Note that to bring the orientations of the major axes of the flat cross sections, either the both end portions 5 of the flat-tube U-bend 3 or the U-shaped main body portion 6 may be twisted.

Also, in the heat exchanger 20 of Embodiment 1, the flat-tube U-bend 3 is created by bending a straight tube, made of a circle-shaped tube that is circular in cross section, into a U-shape in the same plane X and compressing the entire circular-tube U-bend 30A in the tube diameter direction. This method reduces a bend radius in bending the straight tube into a U-shape and eliminates the need to create an extrusion die.

Figure 10:
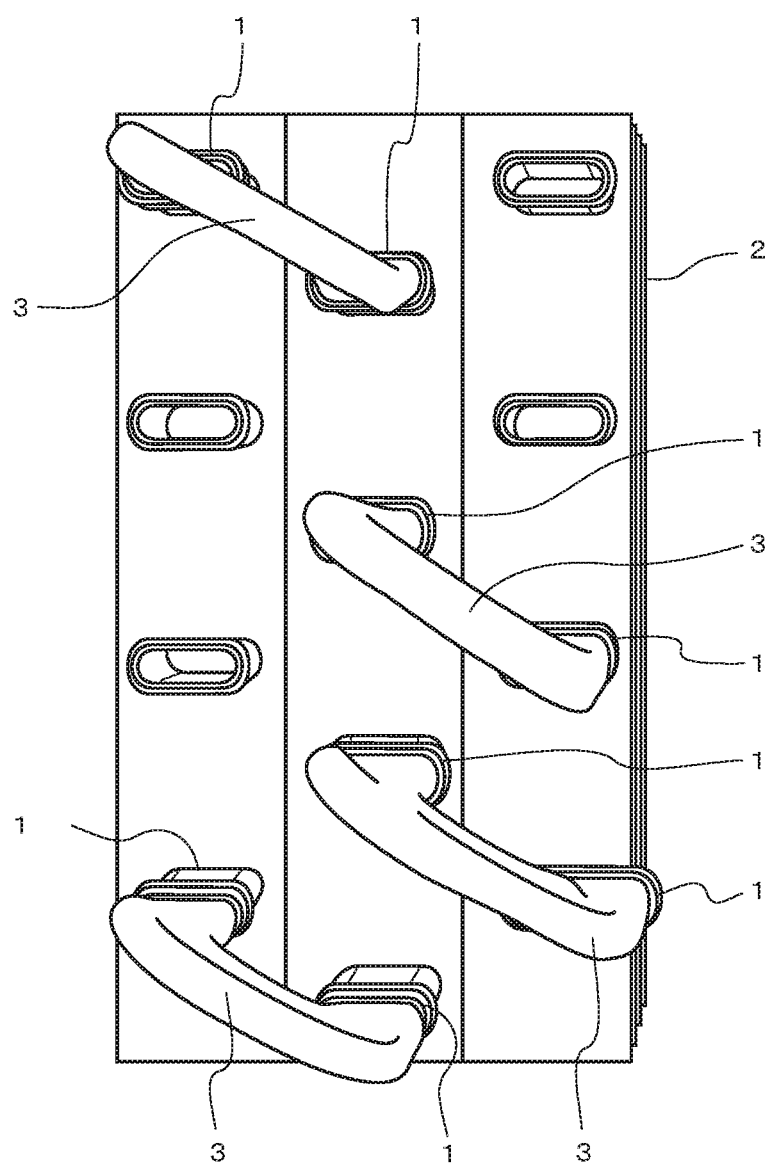
FIG. 10 is a perspective view showing another example of the heat exchanger according to Embodiment 1 of the present invention.

A structure containing two columns of the flat tubes 1 has been described as an example. However, similar effects can be achieved using the flat-tube U-bend 3 even in the case of a heat exchanger, such as shown in FIG. 10, containing three or more columns of the flat tubes 1 arranged in a staggered manner.

Embodiment 2

Figure 6:
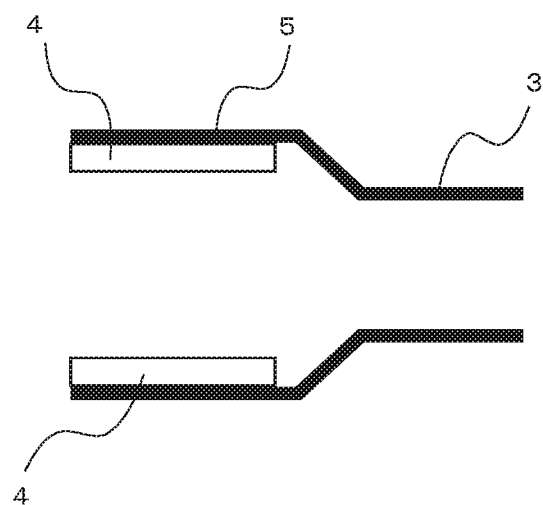
FIG. 6 is a schematic diagram showing an example of a caulked brazing ring inside an end portion of a flat-tube U-bend in a heat exchanger according to Embodiment 2 of the present invention.

FIG. 6 is a schematic diagram showing an example of a caulked brazing ring inside an end portion of a flat-tube U-bend in a heat exchanger according to Embodiment 2 of the present invention.

In the heat exchanger 20 of Embodiment 2, as shown in FIG. 6, when the end portions 5 of the flat-tube U-bend 3 are expanded, brazing rings 4 are placed inside the end portions 5, caulked together with the end portions 5, and thereby caulked onto inner surfaces of the both end portions 5. Subsequently, the flat tubes 1 to be connected are inserted into the end portions 5, and the flat tubes 1 and the flat-tube U-bend 3 are loaded as they are into a furnace, and consequently the flat tubes 1 and the flat-tube U-bend 3 are joined together by brazing.

In this manner, in the heat exchanger 20 of Embodiment 2, when the end portions 5 of the flat-tube U-bend 3 are expanded, the brazing rings 4 are placed inside the end portions 5, caulked together with the end portions 5, and thereby caulked inside the both end portions 5. This method omits the process of inserting brazing material into the both end portions 5 of the flat-tube U-bend 3 when the flat tubes 1 are inserted into the both end portions 5.

Figure 7:
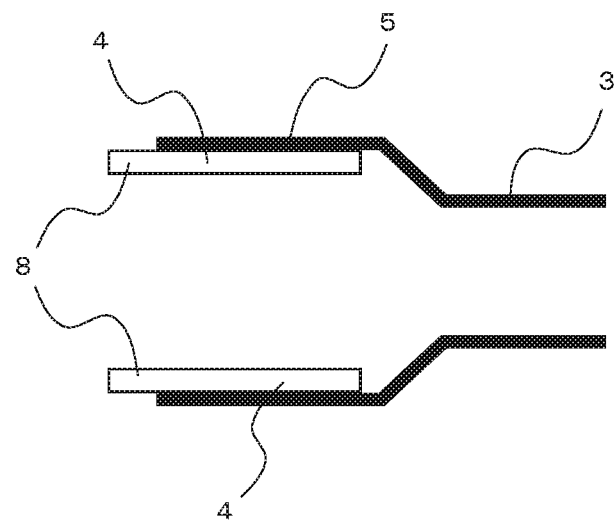
FIG. 7 is a schematic diagram showing an example of a caulked brazing ring inside the end portion of the flat-tube U-bend in the heat exchanger according to Embodiment 2 of the present invention.

FIG. 7 is a schematic diagram showing an example of a caulked brazing ring inside the end portion of the flat-tube U-bend in the heat exchanger according to Embodiment 2 of the present invention.

Here a brazing ring 4 is caulked inside each end portion 5 of the flat-tube U-bend 3 such that the brazing ring 4 protrudes outward from a tip of the end portion 5.

In this manner, by caulking the brazing ring 4 such that the brazing ring 4 protrudes from the end portion 5 and by brazing the brazing ring 4 and the end portion 5, an outer fillet is formed by a protrusion 8 of the brazing ring 4 protruding from the end portion 5. Consequently, working efficiency of visual inspection is improved.

Embodiment 3

Figure 8:
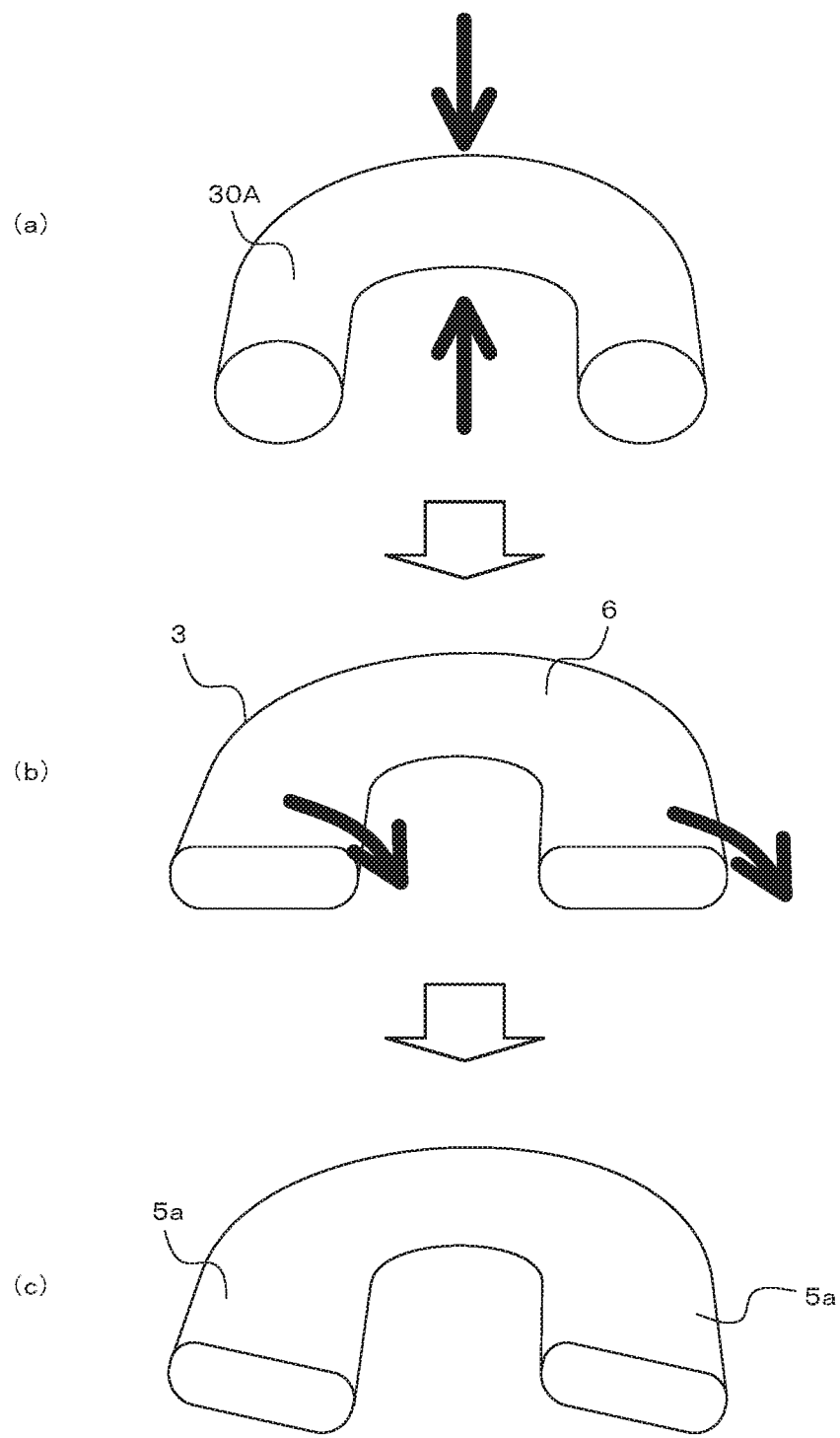
FIG. 8 is a process chart showing a method of producing a flat-tube U-bend of a heat exchanger according to Embodiment 3 of the present invention.

Next, a method of producing a heat exchanger of Embodiment 3 of the present invention will be described in line with FIG. 8 and with reference to FIGS. 1 to 4. FIG. 8 is a process chart showing a method of producing a flat-tube U-bend of the heat exchanger according to Embodiment 3 of the present invention. Note that flow paths inside a tube are not illustrated.

In producing the heat exchanger 20, first, a circular straight tube having a cross section whose final shape can have an expanded size is bent into a U-shape in the same plane X such that the circular tube bridges between the flat tubes 1 that are arranged in a staggered manner and are to be connected to the flat-tube U-bend 3, thereby creating a circular-tube U-bend 30A (Part (a) of FIG. 8). Next, the flat-tube U-bend 3 is created by compressing the entire circular-tube U-bend 30A in the tube diameter direction such that the circular-tube U-bend 30A becomes flat in cross section (Part (b) of FIG. 8). Then, to allow the flat-tube U-bend 3 to be joined with the flat tubes 1 to be connected, the entire flat-tube U-bend 3 is twisted such that the major axes of the flat cross sections in both end portions 5a of the flat-tube U-bend 3 are oriented in the same direction as the major axes of the flat cross sections of the flat tubes 1 to be connected and is consequently brought to a final shape (Part (c) of FIG. 8). Subsequently, the end portions 5a of the circular-tube U-bend 30A and the flat tubes 1 arranged in a staggered manner are joined together by brazing to thereby obtain the heat exchanger such as shown in FIG. 1.

The method of producing a heat exchanger according to Embodiment 3 creates the circular-tube U-bend 30A by bending a straight tube made of a circle-shaped tube that is circular in shape and having a cross section whose final shape can have an expanded size, and then creates the flat-tube U-bend 3 by compressing the entire circular-tube U-bend 30A in the tube diameter direction, and thus can reduce a bend radius in bending the straight tube into a U-shape. Also, a tube expansion process can be omitted.

When any change in the flat-shaped cross section is caused depending on the twist angle θ, preferably, for example, the shape is corrected by hydraulic tube expansion or other methods, thereby securing flow paths.

Embodiment 4

Figure 9:
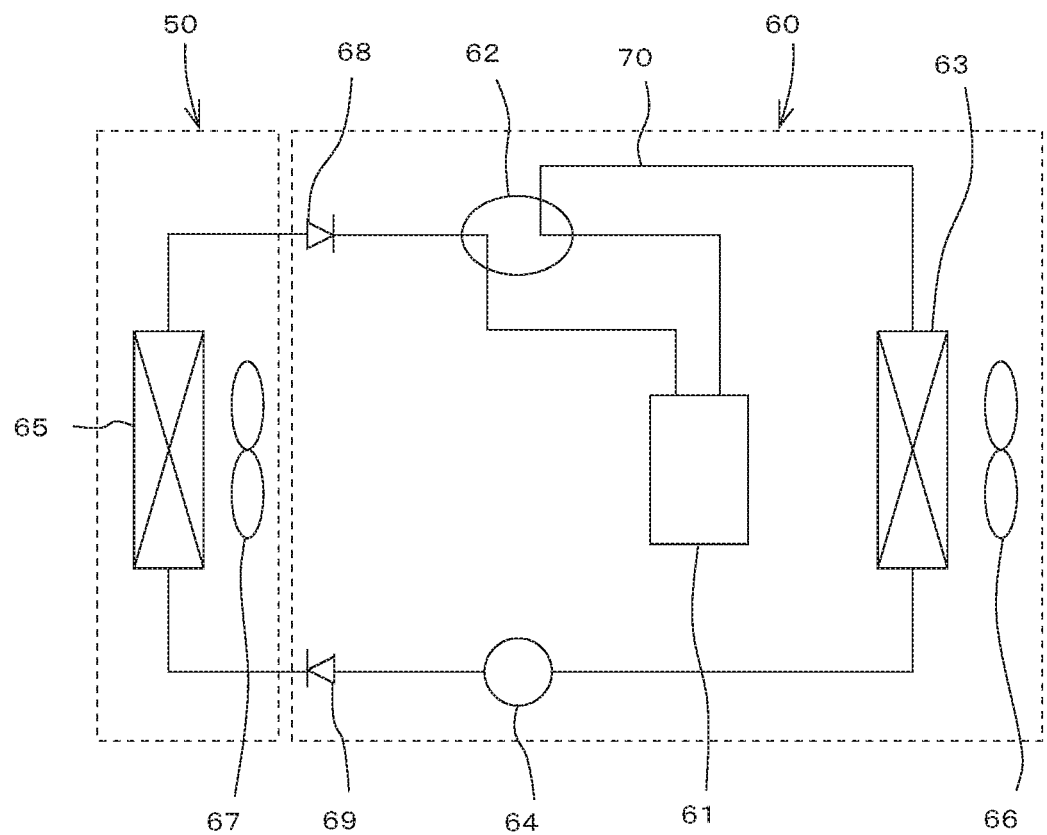
FIG. 9 is a refrigerant circuit diagram of an air-conditioning apparatus according to Embodiment 4 of the present invention.

FIG. 9 shows a refrigerant circuit diagram of an air-conditioning apparatus according to Embodiment 4 of the present invention, where the heat exchanger 20 described in Embodiment 1 is used as an outdoor heat exchanger or an indoor heat exchanger.

In the air-conditioning apparatus, a compressor 61, a four-way valve 62, an outdoor heat exchanger 63, a decompressor 64, and an indoor heat exchanger 65 are annularly connected via refrigerant pipes 70, and valves 68 and 69 are placed between an indoor unit 50 and an outdoor unit 60. Also, an outdoor fan 66 is provided to the outdoor heat exchanger 63 and an indoor fan 67 is provided to the indoor heat exchanger 65.

In the air-conditioning apparatus of Embodiment 4, during cooling operation, low-temperature and low-pressure gas refrigerant is compressed into high-temperature and high-pressure gas refrigerant by the compressor 61 of the outdoor unit 60 and sent to the four-way valve 62. Then, the gas refrigerant is led from the four-way valve 62 to the outdoor heat exchanger 63 through a refrigerant pipe 70. The outdoor heat exchanger 63 exchanges heat between the refrigerant and air and releases heat of condensation outdoors. That is, the outdoor heat exchanger 63 acts as a condenser. High-pressure liquid refrigerant leaving the outdoor heat exchanger 63 is turned into low-temperature and low-pressure two-phase gas-liquid refrigerant by the decompressor 64 and led to the indoor heat exchanger 65 of the indoor unit 50 via the valve 69. The indoor heat exchanger 65 exchanges heat between the refrigerant and air and performs cooling operation to cool indoor space. That is, the indoor heat exchanger 65 acts as an evaporator. Then, low-temperature and low-pressure gas refrigerant is led to the compressor 61 through the valve 68 and the four-way valve 62 to perform refrigerant cycle operation.

To perform heating operation, flow of refrigerant is reversed from that of cooling operation by switching the four-way valve 62. Consequently, the indoor heat exchanger 65 acts as a condenser and the outdoor heat exchanger 63 acts as an evaporator. Otherwise, the heating operation is similar to the cooling operation.

As the heat exchanger 20 of Embodiment 1 is used as the outdoor heat exchanger 63 or the indoor heat exchanger 65, the air-conditioning apparatus of Embodiment 4 can be produced easily, allowing production cost of the air-conditioning apparatus to be reduced.

REFERENCE SIGNS LIST 1 flat tube 1a flow path 2 fin 3 flat-tube U-bend 4 brazing ring 5, 5a end portion of flat-tube U-bend 6 main body portion of flat-tube U-bend 8 protrusion of brazing ring 20 heat exchanger 30A circular-tube U-bend 50 indoor unit 60 outdoor unit 61 compressor 62 four-way valve 63 outdoor heat exchanger 64 decompressor 65 indoor heat exchanger 66 outdoor fan 67 indoor fan 68 valve 69 valve 70 refrigerant pipe X same plane θ twist angle

The invention claimed is:
1. A heat exchanger comprising a plurality of flat tubes each having a flat cross section, and a plurality of flat-tube U-bends each having a flat cross section and a U-shape in external appearance,
   a plurality of flat-tube columns each made up of the plurality of flat tubes installed in a plurality of tiers in a set direction being arranged in a direction intersecting the set direction,
   the plurality of flat tubes in the plurality of flat-tube columns being arranged in a staggered manner in the set direction,
   each of the plurality of flat-tube U-bends being connected to a pair of coupling portions of the plurality of flat tubes,
   each of the pair of coupling portions being placed in one of a pair of the plurality of flat-tube columns that are next to each other in the direction intersecting the set direction,
   the plurality of flat-tube U-bends being twisted such that major axes of flat cross sections in both end portions of each of the plurality of flat-tube U-bends are oriented in same directions as major axes of flat cross sections of the plurality of flat tubes connected to the both end portions,
   the both end portions of each of the plurality of flat-tube U-bends being twisted with respect to another portion of a respective flat-tube U-bend.
2. The heat exchanger of claim 1, wherein brazing material is interposed in junctions between the plurality of flat-tube U-bends and the plurality of flat tubes.
3. The heat exchanger of claim 1, wherein a plurality of fins penetrated by the plurality of flat tubes are arranged in parallel.
4. The heat exchanger of claim 1, wherein an inner part of each of the plurality of flat tubes is divided into a plurality of flow paths.
5. The heat exchanger of claim 1, wherein
   the plurality of flat-tube U bends each includes a first flat surface and a second flat surface opposing the first flat surface,
   each of the plurality of flat-tube U bends is twisted so that a vertical positional relationship of the first flat surface and the second flat surface is maintained from one end of the each of the flat-tube U bends to another end of the each of the flat-tube U bends.
6. An air-conditioning apparatus comprising at least a compressor, an outdoor heat exchanger, a decompressor, and an indoor heat exchanger, which are annularly connected via refrigerant pipes,
   wherein the air-conditioning apparatus further comprises the heat exchanger of claim 1 as at least one of the outdoor heat exchanger and the indoor heat exchanger.
7. A method of producing a flat-tube U-bend, the method comprising:
   bending a tube that is straight and circular in cross section into a U-shape in a same plane;
   compressing the tube in a tube diameter direction so that the tube has a flat cross section; and
   twisting at least both end portions of the tube having a U-shape and the flat cross section, such that major axes of flat cross sections in the both end portions are oriented in same directions as major axes of flat cross sections of two flat tubes to be connected to the tube having the U-shape and the flat cross section, the two flat tubes being located at different heights.
8. The method of claim 7, wherein inner sides of the both end portions are expanded.

9. The method of claim 8, wherein brazing rings for welding are caulked onto inner walls of the both end portions when the inner sides of the both end portions are expanded.

10. The method of claim 9, wherein the brazing rings are caulked such that the brazing rings protrude out of the both end portions.

11. A heat exchanger, comprising:
a plurality of flat tubes each having a flat cross section, each of the plurality of flat tubes including at least one flow path and a coupling portion on at least one end of the at least one flow path; and
a plurality of flat-tube U-bends each having a flat cross section and a U-shape in external appearance, each of the plurality of flat-tube U-bends including a curved body portion, a first end portion located on a first end of the curved body portion, and a second end portion located on a second end of the curved body portion, wherein
the first end portion of each of the plurality of flat-tube-U-bends has a first flat cross-section formed along a U-bend major axis,
the second end portion of each of the plurality of flat-tube-U-bends has a second flat cross-section formed along the U-bend major axis,
the plurality of flat tubes each have a flat cross section formed along a flat-tube major axis,
a first set of two or more of the plurality of flat tubes are arranged in a first column in a first direction,
a second set of two or more of the plurality of flat tubes are arranged in a second column in the first direction,
the first and second columns are arranged in a second direction intersecting the first direction,
the first set of two or more of the plurality of flat tubes are arranged in a staggered manner with respect to the second set of two or more of the plurality of flat tubes in the first direction,
each of the plurality of flat-tube U-bends is connected between a corresponding first flat tube selected from the first set of two or more of the plurality of flat tubes and a corresponding second flat tube selected from the second set of two or more of the plurality of flat tubes,
each of the plurality of flat-tube U-bends is twisted such that the U-bend major axis of the corresponding first and second ends is oriented in a same direction as the flat-tube major axes of the corresponding first and second flat tubes,
in each of the plurality of flat-tube U-bends, a corresponding first end portion and a corresponding second end portion are twisted with respect to a corresponding curved body portion.

12. The heat exchanger of claim 11, further comprising:
a brazing material interposed in junctions between the plurality of flat-tube U-bends and the plurality of flat tubes.

13. The heat exchanger of claim 11, further comprising:
a plurality of fins penetrated by the plurality of flat tubes, wherein
the plurality of fins are arranged in parallel.

14. The heat exchanger of claim 11, wherein
each of the flat tubes includes a plurality of flow paths arranged along the flat-tube major axis.

15. An air-conditioning apparatus comprising:
a compressor;
an outdoor heat exchanger;
a decompressor; and
an indoor heat exchanger,
wherein
the compressor, the outdoor heat exchanger, the decompressor; and the indoor heat exchanger are annularly connected via refrigerant pipes, and
at least one of the outdoor heat exchanger and the indoor heat exchanger comprises the heat exchanger of claim 11.

* * * * *